UNITED STATES PATENT OFFICE.

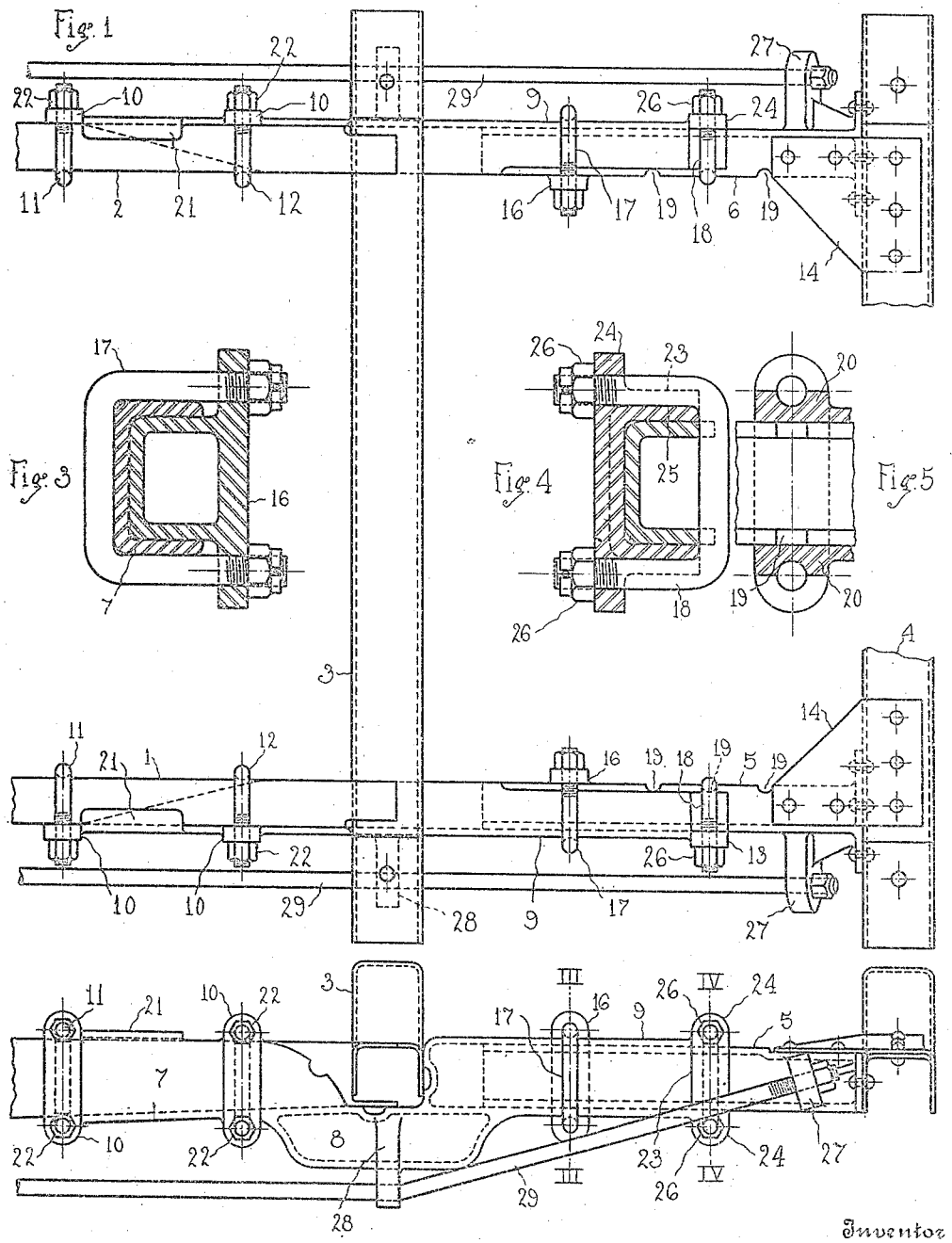

NELS L. OLSON, OF DETROIT, MICHIGAN.

EXTENSION FOR VEHICLES.

1,247,993.   Specification of Letters Patent.   Patented Nov. 27, 1917.

Application filed March 12, 1917. Serial No. 154,320.

*To all whom it may concern:*

Be it known that I, NELS L. OLSON, a citizen of the United States of America, residing at Detroit, in the county of Wayne and State of Michigan, have invented certain new and useful Improvements in Extensions for Vehicles, of which the following is a specification, reference being had therein to the accompanying drawings.

This invention relates to a vehicle extension, and has special reference to an adjustable frame extension for motor vehicles, particularly that type having an adjustable drive extension.

My present invention is characterized by extension members that may be attached to an ordinary vehicle frame, without alterations, and connected to the extension members is a fabricated extension frame. The manner of connecting the extension frame to the extension members permits of the extension frame being adjusted for vehicle bodies of different lengths and extended drive connections. The manner of articulating the extension members and frame relative to an ordinary vehicle frame insures rigidity and great strength, and provision is also made for trussing the extension frame relative to the vehicle frame, so that the vehicle frame can be used for heavy truck work.

My invention will be hereinafter described and then claimed, and reference will now be had to the drawing, wherein—

Figure 1 is a plan of a portion of a vehicle frame provided with an adjustable extension frame, which is partly broken away;

Fig. 2 is a side elevation of the same;

Fig. 3 is an enlarged cross sectional view taken on the line III—III of Fig. 2;

Fig. 4 is a similar view taken on the line IV—IV of Fig. 2, and

Fig. 5 is a longitudinal sectional view of a portion of the extension frame.

In the drawings, the reference numerals 1 and 2 denote vehicle side frames connected by a transverse frame or member 3 and this construction is common in connection with many vehicle frames, particularly the "Ford" chassis.

Connected to the side frames 1 and 2 by U-bolts 11 and 12 or similar fastening means are extension members, comprising side plates 7, stirrup portions 8 and channel portions 9. The side plates 7 have flanges 21 engaging the frames 1 and 2 to correctly position said side plates, brace and prevent vertical displacement of the extension members relative to the vehicle frame. The side plates 7 are also provided with enlargements or apertured lugs 10, to receive the U-bolts 11 and 12, which embrace the side frames 1 and 2, and permit of nuts 22 being screwed upon the U-bolts to firmly clamp the side plates 7 against the outer sides of the frames 1 and 2.

The stirrup portions 8 of the extension members are channel shaped in cross section and these portions provide clearance for the end member or frame 3, as best shown in Fig. 2. The end member 3 may rest upon the stirrup portions 8 and said stirrup portions provide additional supporting means for the end member, besides the frames 1 and 2, particularly when the extension is trussed relative to the vehicle frame.

The channel portions 9 of the extension members abut the rear member 3 and are adapted to receive the side arms 6 of the extension frame, said side arms being connected by a transverse member 4 and gusset plates 14. The arms 5 and 6 are channel shaped in cross section and the top and bottom flanges of said arms, adjacent the ends thereof, are connected by straps 16 providing apertured lugs adapted to receive U-bolts 17 embracing the channel portions 9 of the extension members. The top and bottom flanges of the arms 5 and 6 are also notched, as at 19, to receive U-bolts 18 carried by the ends of the channel portions 9 of the extension members. The ends of the channel portions 9 have the outer ends thereof provided with ribs or enlargements 23 with the vertical ribs terminating in apertured lugs 24 and the lateral ribs formed with seats 25 for the lateral portions of the U-bolts 18. When nuts 26 are screwed upon the U-bolts said bolts are anchored relative to the channel portions 9 and by reason of said bolts engaging in the notches 19 of the arms 5 and 6, it is impossible for said arms to shift longitudinally of the extension members. It is an easy matter however, to loosen the nuts on the U-bolts 17 and 18, shift the arms 5 and 6 to a desired position in the channel portions 9, and then tighten the nuts of the U-bolts so that the arms 5 and 6 are positively rigid relative to the extension members.

The arms 5 and 6, adjacent the transverse member 4 are provided with outwardly extending braced apertured ears 27 and the outer sides of the stirrup portions 8 of the extension members have apertured ears 28. Extending through the apertured ears 27 and 28 are truss rods 29 and these rods are adapted to have the forward ends thereof connected to a transverse member or front end bearing (not shown) of a chassis or vehicle frame.

Considering my invention from a commercial standpoint, the rear or transverse members 3 and 4 are identical in construction and as the rear member 3 is of standard design, the transverse member 4 can be easily obtained, consequently it is only necessary for me to provide the arms 5 and 6, the extension members and other minor parts in order to obtain an extension frame that can be easily and quickly installed.

One embodiment of my invention has been illustrated, but it is to be understood that the structural elements are susceptible to such variations and modifications as fall within the scope of the appended claims.

What I claim is:—

1. In a vehicle extension, a vehicle frame, extension members connected to the sides of said vehicle frame and provided with rearwardly extending channel portions, an extension frame having arms slidable in the channel portions of said extension members, and means engaging in the arms of said extension frame and the channel portions of said extension members adapted for holding said extension frame in adjusted positions.

2. The combination with a vehicle frame, extension members connected to the sides thereof and having end channel portions, an extension frame having arms slidable in the channel portions of said extension members, and U-bolts adapted for holding the arms of said extension frame relative to the channel portions of said extension members.

3. The combination with a vehicle frame, extension members carried by the sides thereof, an adjustable extension frame carried by said members, and truss rods adapted for connecting said vehicle frames, said extension members and said extension frame.

4. The combination of a vehicle frame, extension members fixed relative thereto and provided with channel portions, an extension frame having arms slidable in the channel portions of said extension members, U-bolts carried by the arms of said extension frame in sliding engagement with the channel portions of said extension members, and U-bolts carried by the channel portions of said extension members and adapted to engage in the arms of said extension frame to lock said frame relative to said extension members.

In testimony whereof I affix my signature in the presence of two witnesses.

NELS L. OLSON.

Witnesses:
ANNA M. DORR,
KARL H. BUTLER.

Copies of this patent may be obtained for five cents each, by addressing the "Commissioner of Patents, Washington, D. C."